(12) United States Patent
Ramos et al.

(10) Patent No.: US 9,959,437 B1
(45) Date of Patent: May 1, 2018

(54) ORDINARY OBJECTS AS NETWORK-ENABLED INTERFACES

(71) Applicant: Amazon Technologies, Inc., Seattle, WA (US)

(72) Inventors: Gonzalo Alberto Ramos, Kirkland, WA (US); Charles Shearer Dorner, Seattle, WA (US); William R. Hazlewood, Seattle, WA (US); Wesley Scott Lauka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 575 days.

(21) Appl. No.: 14/563,002

(22) Filed: Dec. 8, 2014

(51) Int. Cl.
    G08B 21/00    (2006.01)
    G06K 7/10     (2006.01)
    G06Q 30/00    (2012.01)

(52) U.S. Cl.
    CPC ......... *G06K 7/10366* (2013.01); *G06Q 30/01* (2013.01)

(58) Field of Classification Search
    CPC ........... G06K 7/10366; G06K 7/10009; G06K 19/0723; G06K 7/10316; G06Q 30/01
    USPC ........................................................ 340/10.1
    See application file for complete search history.

(56) References Cited

U.S. PATENT DOCUMENTS

| | | | |
|---|---|---|---|
| 2004/0075534 A1* | 4/2004 | Pierce | G06K 19/04 340/10.5 |
| 2007/0252695 A1* | 11/2007 | Bhavani | G08B 13/14 340/572.1 |
| 2010/0063652 A1* | 3/2010 | Anderson | A61B 5/02438 701/2 |
| 2010/0114426 A1* | 5/2010 | Boss | G06Q 10/06 701/33.4 |
| 2014/0214623 A1* | 7/2014 | Cancro | G06Q 30/0623 705/26.63 |
| 2015/0379791 A1* | 12/2015 | Russell | G07C 9/00031 340/5.61 |

* cited by examiner

Primary Examiner — Mark Rushing
(74) Attorney, Agent, or Firm — Thomas | Horstemeyer, LLP

(57) ABSTRACT

Disclosed are various embodiments for making ordinary objects network-enabled interfaces. A radio-frequency identification (RFID) tag may be fixed or detachably attached to an item capable of being manipulated by a person to obtain information about the item or to cause a performance of a task associated with the item. The RFID tag may include a capacitive touch interface that, when manipulated by a person, causes the RFID tag to emit an identifier associated with a corresponding item. A receiver, having the identifier and an instruction from a person, may communicate with a remote computing device to process the instruction and to generate a response to the instruction.

20 Claims, 6 Drawing Sheets

ORDINARY OBJECTS AS NETWORK-ENABLED INTERFACES

BACKGROUND

People have an assortment of items in their home or office that are purchased from retail stores or online. Once an item is purchased, the user is typically limited to information listed in a manual included with the item when it was purchased, or the user is limited to the information listed on the item itself.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
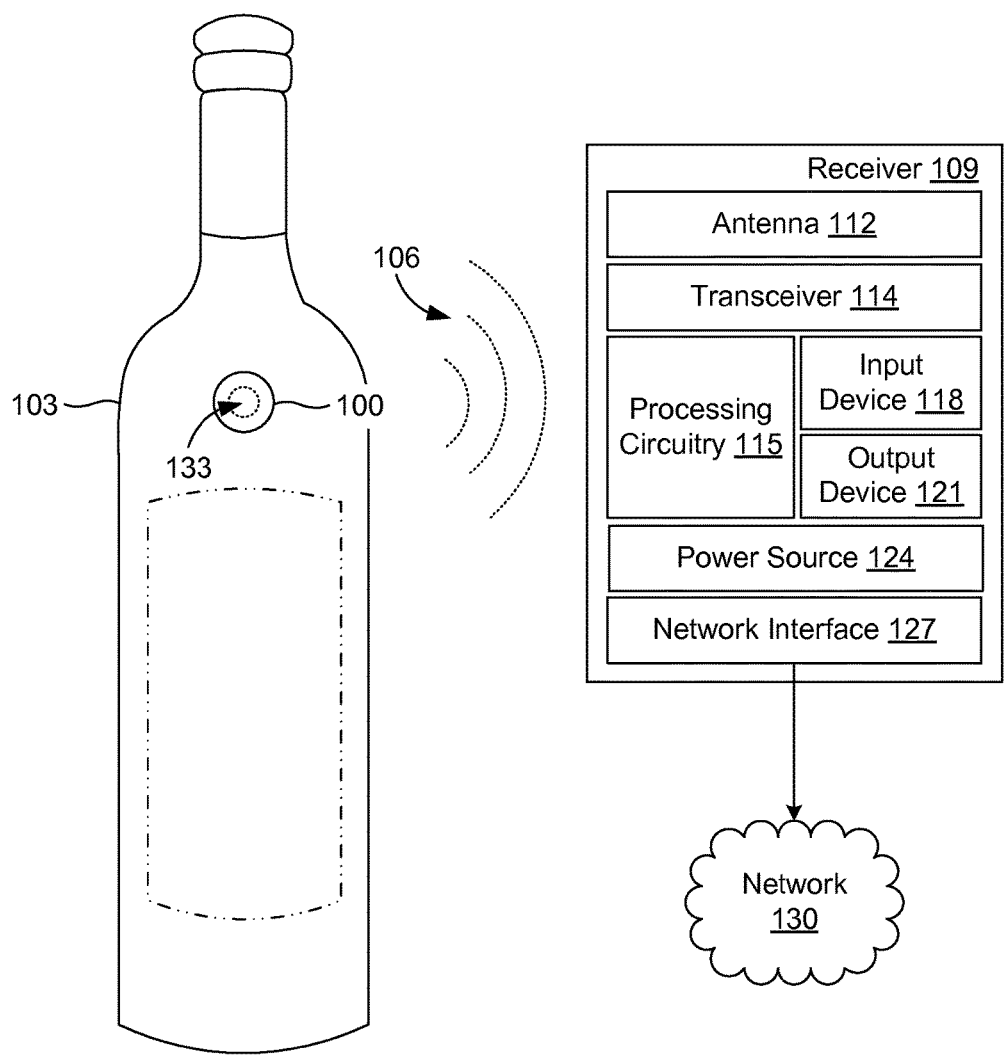
FIG. 1 is a drawing of an RFID tag and a receiver capable of reading the RFID tag according to various embodiments of the present disclosure.

The present disclosure relates to making ordinary objects network-enabled interfaces. As discussed above, people have an assortment of items in their home or office that are purchased from retail stores or online. For example, people may purchase groceries from a grocery store, office supplies from an office supply outlet, clothing from a department store, and electronics from an online merchant. Once an item is purchased and taken to a home or office, a person is typically limited to information listed in a manual included with the item when it was purchased or the information listed on the item itself. Accessing additional information associated with the item may be problematic. For example, if the user desires to find more information associated with an item, the user must consult the manual, review the item's label, or the user may resort to conducting searches online.

According to various embodiments as described herein, a radio-frequency identification (RFID) tag may be fixed or detachably attached to an item capable of being manipulated by a person to obtain information about the item or to cause performance of a task or an event associated with the item. The RFID tag may include a capacitive touch interface that, when manipulated by a person, causes the RFID tag to emit an identifier associated with a corresponding item. As a non-limiting example, a person may physically touch or press an RFID tag fixed on a box of cereal to obtain nutritional information associated with the cereal or to add a same brand of cereal to a shopping list. The RFID tag fixed to the item may be preconfigured with an identifier that identifies the box of cereal such that a receiver obtains context of the item associated with the RFID tag. While the RFID tag is being touched or pressed by the person, a user may vocalize a command to the receiver such as "provide nutritional information" or "add this item to my shopping list." The receiver, having the identifier and an instruction from a person, may communicate with a remote computing device to process the instruction and to generate a response to the instruction, if necessary. In this example, the nutritional information may be obtained according to the instruction using the identifier. The nutritional information may be sent back to the receiver to be presented to a user, for example, as audio played through a speaker.

According to various embodiments, a receiver is configured to identify a radio-frequency signal emitted from an RFID tag or transponder, wherein the radio-frequency signal includes an identifier capable of identifying the item associated with the RFID tag or transponder. The receiver may obtain user input in association with the item. For example, the receiver may be configured to obtain a voice command (e.g., a question or an instruction) or a body gesture made by a person. The receiver may communicate the identifier and the user input to a computing device (e.g., a remote computing device) over a network for processing. Further, the receiver may be configured to perform a task communicated by the computing device to the receiver. In the following discussion, a general description of the system and its components is provided, followed by a discussion of the operation of the same.

With reference to FIG. 1, shown is a non-limiting example of an RFID tag 100 fixed or detachably attached to an item 103 according to various embodiments of the present disclosure. Although the item 103 of FIG. 1 depicts a bottle (e.g., a bottle of wine or a bottle of olive oil), the item 103 may comprise any object capable of identification via the RFID tag 100. For example, the item 103 may comprise an electronic device, a perishable food product, or any other item capable of identification. To identify the item 103, the RFID tag 100 communicates electronically stored information over a radio-frequency electromagnetic field 106 to a receiver 109.

In various embodiments, the RFID tag 100 comprises a passive RFID tag 100 or an active RFID tag 100. As may be appreciated, passive RFID tags 100 do not require a power source as they are typically powered by the radio-frequency electromagnetic field 106 emitted by the receiver 109. Conversely, active RFID tags 100 may use a local power source, such as a battery, to emit radio waves. As the passive RFID tags 100 do not have a local power source and instead rely on power obtained from the radio-frequency electromagnetic field 106, the range of communicating electronically stored information may be less than the range of an active RFID tag 100.

The receiver 109, acting as a radio-frequency (RF) receiver, is configured to obtain and/or process the electronically stored information transmitted over the radio-frequency electromagnetic field 106. According to various embodiments as described herein, the receiver 109 may comprise an antenna 112, a transceiver 114, processing circuitry 115, an input device 118, an output device 121, a power source 124, a network interface 127, and/or other components as can be appreciated. The antenna 112 may comprise a radio-frequency antenna configured to obtain the electronically stored information emitted from the RFID tag 100 over the radio-frequency electromagnetic field 106. Assuming that the RFID tag 100 is a passive RFID tag 100, the transceiver 114 may be utilized to generate the radio-frequency electromagnetic field 106 to provide power to the passive RFID tag 100 to emit a response including the electronically stored information in the passive RFID tag 100.

The processing circuitry 115 may comprise physical circuitry, software, or a combination thereof, capable of controlling the components of the receiver 109 and/or processing the electronically stored information to recognize an identifier. In various embodiments, the processing circuitry 115 comprises at least one hardware processor. Further, in various embodiments, the processing circuitry 115 comprises an integrated circuit and/or a microcontroller.

The input device 118 in the receiver 109 includes one or more input devices 118 that are configured to obtain user input from a person. In various embodiments, the input device 118 comprises a microphone and the user input may comprise an audio signal obtained by the microphone, for example, when a person vocalizes a request or command to the receiver 109. The audio signal obtained by the microphone may be transmitted over the network 130 via the network interface 127 to a computing environment for speech recognition or other processing. Similarly, in other embodiments, the input device 118 may comprise a gesture recognition device, such as an imaging device or digital camera, and the user input may comprise one or more images obtained by the camera that may be parsed to identify a gesture made by the person.

The output device 121 includes one or more output devices 121 that are configured to perform a task, such as responding to or acknowledging that user input has been successfully obtained by the receiver 109. As a non-limiting example, a person may manipulate an RFID tag 100 located on a label of a bottle of wine. While the person is manipulating the RFID tag 100, the person may vocally instruct the receiver 109 to place a same or similar item 103 in a virtual shopping cart associated with an electronic commerce application. The receiver 109 may respond to the instruction by performing various tasks, such as playing a tone or a generated audio message through a speaker.

The power source 124 includes a battery or a connection to an external power source (e.g., a wall power outlet) that may power one or more of the components of the receiver 109. The network interface 127 includes one or more network interfaces 127 that communicatively couples the receiver 109 to a network 130. In various embodiments, the network interface 127 may be employed to send or transmit user input obtained by the input device 118 to a local or remote computing device for processing. Further, the network interface 127 may be employed to receive information associated with tasks from the local or remote computing device.

In various embodiments, the RFID tag 100 comprises a microchip communicatively coupled to a radio antenna. The RFID tag 100 communicates electronically stored information to the receiver 109 from its resident memory, which may include an identifier of the item 103, such as an electronic product code (EPC). According to various embodiments, the RFID tag 100 may be a passive RFID tag 100 having a capacitive touch interface that, when manipulated by a person, completes a circuit in the RFID tag 100, thereby causing the RFID tag 100 to emit an identifier capable of being read by the receiver 109. To this end, when the RFID tag 100 is not touched or otherwise manipulated by a person, the RFID tag 100 is in an inactive state incapable of identification by the receiver 109.

The RFID tag 100 may comprise a touch-sensitive interface 133 according to various embodiments. To this end, the touch-sensitive interface 133 may comprise a capacitive touch interface. For example, if a person touches or otherwise manipulates the touch-sensitive interface 133 or capacitive touch interface of the RFID tag 100 associated with an item 103, completion of a circuit is caused in the RFID tag 100. In response to completion of the circuit, the RFID tag 100 emits an identifier capable of being read by the receiver 109. When the RFID tag 100 is not touched or otherwise manipulated by a person, the RFID tag 100 is in an inactive state incapable of identification by the receiver 109.

Although the components of the receiver 109 are shown as being part of the receiver 109, in various embodiments, one or more of the components may be external to and communicatively coupled to the receiver 109. For example, the output device 121 may comprise an external speaker communicatively coupled to the receiver 109. In some embodiments, the output device 121 may comprise a display device, such as a liquid crystal display (LCD) device. As another example, the input device 118 may comprise an external microphone communicatively coupled to the receiver 109. In various embodiments, a client device, such as a laptop computing device, a tablet computing device, a mobile computing device, etc., may be used as the input device 118 and/or the output device 121.

Further, the receiver 109 may comprise only the power source 124, the processing circuitry 115, and the network interface 127. In this embodiment, the antenna 112 and the transceiver 114 can be placed at various locations throughout an environment, such as in different rooms in a house, aisles of a retail store, or offices in a business setting. The antenna 112 and the transceiver 114 may communicate RFID data from the RFID tags 100 to the receiver 109 via Bluetooth®, ZigBee®, ultrasonic sound, or other similar technology. In further embodiments, all or a portion of the components of the receiver 109 may be implemented in a wearable device, such as a smartwatch, a fitness band, an optical head-mounted display (OHMD), etc.

Figure 2:
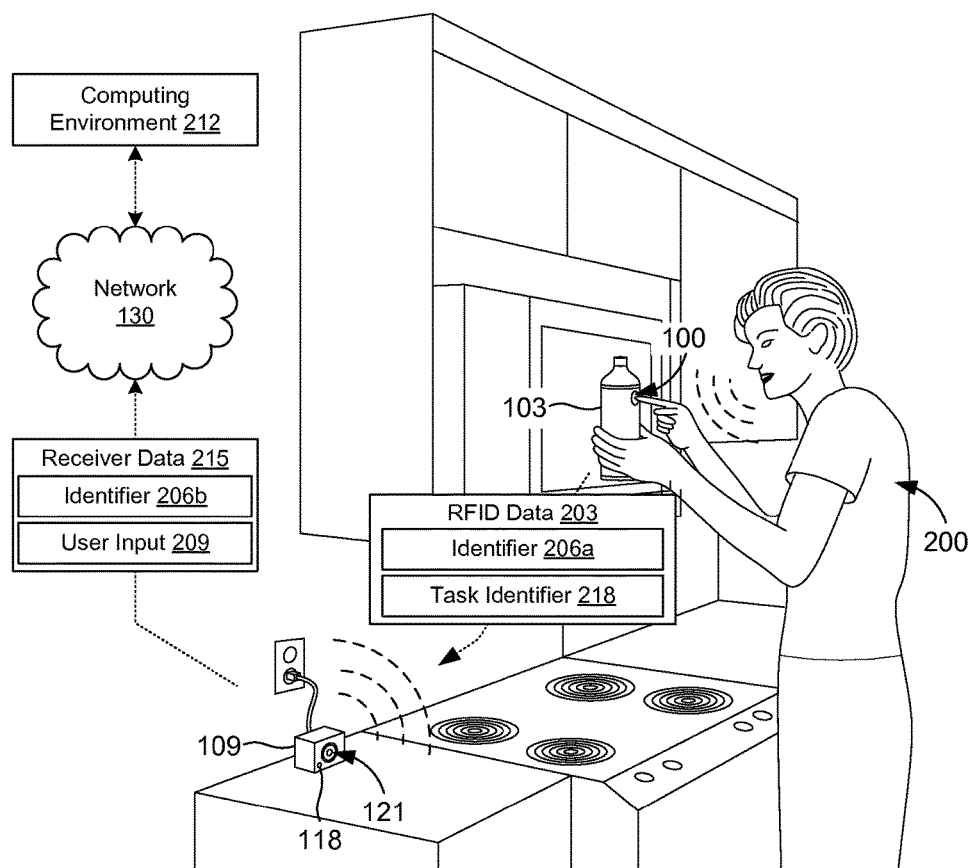
FIG. 2 is a drawing of the RFID tag and the receiver of FIG. 1 during an example operation according to various embodiments of the present disclosure.

Moving on to FIG. 2, shown is a non-limiting example of a person 200 manipulating an RFID tag 100 having a touch-sensitive interface 133 (FIG. 1) according to various embodiments of the present disclosure. In the non-limiting example of FIG. 2, the person 200 touches or otherwise manipulates the touch-sensitive interface 133 of the RFID tag 100 associated with an item 103 which causes completion of a circuit in the RFID tag 100, thereby causing the RFID tag 100 to emit an identifier capable of being read by the receiver 109. As the RFID tag 100 is preconfigured or otherwise registered with data associated with the item 103 to which the RFID tag 100 is attached, the receiver 109 may obtain RFID data 203 transmitted from the RFID tag 100. In various embodiments, the RFID data 203 includes an identifier 206a that identifies the RFID tag 100 and/or the item 103.

Various circumstances may arise where the person 200 desires to obtain more information about the item 103 or to cause performance of a task associated with the item 103. For example, when the person 200 has run out of a particular brand of olive oil, the person 200 may desire to obtain a price of a replacement bottle and, depending on the price, purchase the replacement. To do so, the person 200 may press or otherwise manipulate the RFID tag 100 affixed to the item 103. While the RFID tag 100 is being pressed or manipulated, the person 200 may vocalize a command such as "obtain price of item" or "add this item to my shopping list." The receiver 109, being able to obtain the identifier 206a from the RFID tag 100 while it is pressed or manipulated, may communicate with a computing device over the network 130 to process user input 209, such as the command vocalized by the person 200. Further, the receiver 109 may respond to the user input 209 or request additional information, if necessary.

In the non-limiting example of FIG. 2, a computing environment 212, whether local or remote, accesses receiver data 215 obtained from the receiver 109 over the network 130. In various embodiments, the receiver data 215 includes user input 209 such as a vocalized command or a gesture obtained by the input device 118 of the receiver 109. In addition, the receiver data 215 includes the identifier 206b read from the RFID tag 100. The computing environment 212 is employed to process the user input 209 (e.g., a vocalized command) to determine, for example, that the person 200 desires to place a particular item in a virtual shopping cart. The computing environment 212 may then access an electronic catalog of items 103 to identify a corresponding one of the items 103 to place in a virtual shopping cart associated with the person 200.

Subsequently, the computing environment 212 may generate a response that may be conveyed to the person 200, for example, to confirm placement of the item 103 in the virtual shopping cart, audibly convey the price of the item 103, or provide other information. The response sent from the computing environment 212 to the receiver may cause the performance of a task in the receiver 109. For example, a particular audible tone may be emitted by the speaker to provide the person 200 with an indication that the item 103 has been successfully added to the virtual shopping cart. With respect to the example of the person 200 desiring to obtain a price of the item 103, an audio signal may be generated and communicated to the receiver 109 for playback, wherein the audio signal audibly conveys the price of the item 103 to the person 200.

In various embodiments, the RFID data 203 may comprise, for example, a task identifier 218 beyond the identifier 206a associated with the item 103. The task identifier 218, when received by the receiver 109 or the computing environment 212, may cause performance of a predefined task in the receiver 109 and/or the computing environment 212. For example, one or more RFID tags 100 having the touch-sensitive interface 133 affixed to an item 103 may be associated with a predefined task. A first one of the RFID tags 100 on the item 103 may comprise a task identifier 218 that causes the computing environment 212 to make additional purchases of the item 103 on behalf of the user. For example, the item 103 may be added to a virtual shopping cart associated with an electronic commerce system in response to a manipulation of the RFID tag 100. A second one of the RFID tags 100 may have a different task identifier 218 that facilitates providing a customer review associated with the item 103. For example, a five star review for the item 103 may be created by the computing environment 212 after a manipulation of the RFID tag 100.

In some embodiments, multiple RFID tags 100 may be employed, wherein each of the RFID tags 100 is associated with a different review metric for the item 103. For example, a first RFID tag 100 may be preconfigured to provide a "one star" review for an item 103, a second RFID tag 100 may be preconfigured to provide a "two star" review for an item 103, a third RFID tag 100 may be preconfigured to provide a "three star" review for an item 103, and so forth.

In various embodiments, the RFID tags 100 may have a label describing the task that will be performed in response to a manipulation of the RFID tags 100. For example, an RFID tag 100 may be affixed to an item 103 with the label "press here to confirm that you have received this item." In response to a manipulation of the RFID tag 100, a task identifier 218 may be emitted that, when interpreted by the computing environment 212, causes the computing environment 212 to confirm shipment of the item 103 associated with the RFID tag 100. In various embodiments, user input 209 may not be required as the task identifier 218 provides context of a task to be performed.

However, in some embodiments, the user input 209 may be provided by a user to further define the task to be performed. For example, an RFID tag 100 having a task identifier 218 that, when identified, causes the computing environment 212 to add the item 103 associated with the item identifier 206a to a virtual shopping cart, the user input 209 may define a quantity of items 103 to add to the virtual shopping cart. In another example, an RFID tag 100 having a task identifier 218 that, when identified, causes the computing environment 212 to generate a customer review for the item 103 associated with the item identifier 206a, the user input 209 may define a metric and/or a comment for the customer review. The metric may comprise, for example, a numeric score (e.g., "five stars") vocalized by the user to associate with the item 103 in the customer review. The comment may comprise, for example, one or more words or sentences vocalized by the user to associate with the item 103 in the customer review.

Although the example operation of FIG. 2 shows a person manipulating the RFID tag 100 in a home environment, the disclosure is not so limited. For example, items 103 may be available for purchase on shelves in a retail store and may be fixed with one or more RFID tags 100. A receiver 109 may be located in proximity to the items 103 such that a shopper may use the receiver 109 to obtain additional information about the item 103, determine whether the item 103 has expired, discover uses of the item 103, determine a price of the item 103, etc. Alternatively, items 103 may be stored within a warehouse and may be fixed with one or more RFID tags 100. A receiver 109 may be located in proximity to the items 103 such that a worker may use the receiver 109 to obtain additional information about the item 103, determine whether the item 103 has expired, discover a manufacturer of the item 103, identify a correct placement of the item 103 within the warehouse, etc. In addition, environments other than a home, office, retail location or warehouse facility may benefit from items 103 fixed with one or more RFID tags 100.

Figure 3:
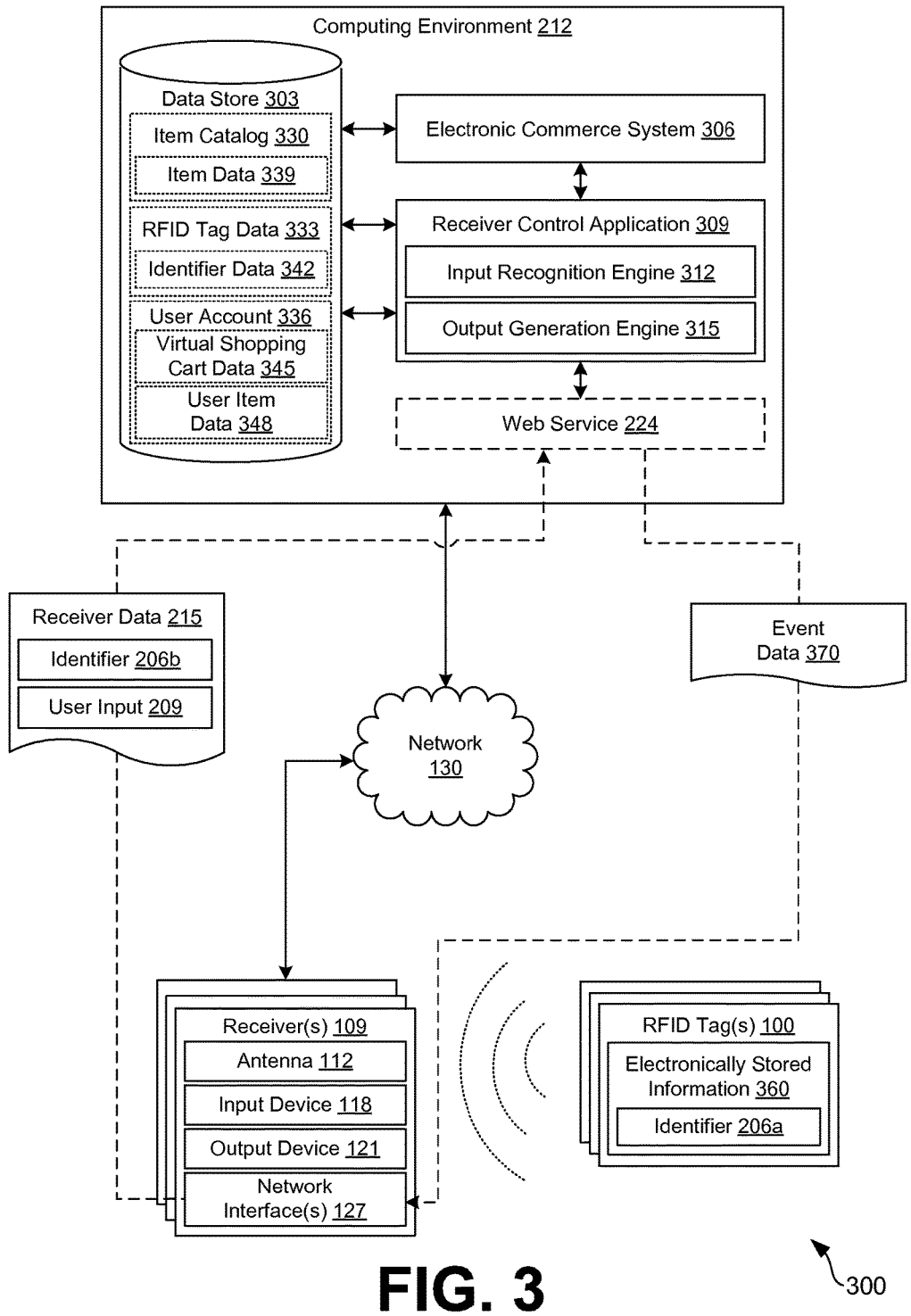
FIG. 3 is a drawing of a networked environment comprising the RFID tag and the receiver of FIGS. 1-2 according to various embodiments of the present disclosure.

With reference to FIG. 3, shown is a networked environment 300 according to various embodiments. The networked environment 300 includes the computing environment 212, one or more receivers 109, and one or more RFID tags 100, which are in data communication with each other via the network 130. The network 130 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 212 may comprise, for example, a server computer or any other system providing computing capability. Alternatively, the computing environment 212 may employ a plurality of computing devices that may be arranged, for example, in one or more server banks or computer banks or other arrangements. Such computing devices may be located in a single installation or may be distributed among many different geographical locations. For example, the computing environment 212 may include a plurality of computing devices that together may comprise a hosted computing resource, a grid computing resource, and/or any other distributed computing arrangement. In some cases, the computing environment 212 may correspond to an elastic computing resource where the allotted capacity of processing, network, storage, or other computing-related resources may vary over time.

Various applications and/or other functionality may be executed in the computing environment 212 according to various embodiments. Also, various data is stored in a data store 303 that is accessible to the computing environment 212. The data store 303 may be representative of a plurality of data stores 303 as can be appreciated. The data stored in the data store 303, for example, is associated with the operation of the various applications and/or functional entities described below.

The components executed on the computing environment 212, for example, include an electronic commerce system 306 and a receiver control application 309, as well as other applications, services, processes, systems, engines, or functionality not discussed in detail herein. The electronic commerce system 306 is executed in order to facilitate the online purchase of items 103 over the network 130. The electronic commerce system 306 also performs various backend functions associated with the online presence of a merchant in order to facilitate the online purchase of items 103 via a client device or the receiver 109. For example, the electronic commerce system 306 may generate network pages, such as web pages or other types of network content, that are provided to client devices for the purposes of selecting items for purchase, rental, download, lease, or other form of consumption as will be described. Similarly, the electronic commerce system 306 may perform backend functions in response to user input 209 provided to the receiver 109, such as directing the electronic commerce system 306 to perform a purchase of an item 103, place an item 103 in a virtual shopping cart or purchase list, confirming receipt of a shipment of the item 103, determining whether the item 103 has expired (e.g., perishable items 103 or items 103 that have been recalled), etc.

The receiver control application 309 is executed to control the receiver 109 and to perform backend functions associated with a user-defined task such as user input 209 that directs the computing environment 212 to perform a function. Further, the receiver control application 309 may process user input 209 using an input recognition application 312 to identify a user-defined command, instruction, question, etc. For example, assuming that the user input 209 comprises an audio signal embodying speech provided by a user of the receiver 109, the receiver control application 309 may use the input recognition application 312 to apply a speech recognition algorithm that converts the speech to one or more machine-readable instructions. These machine-readable instructions may be relayed to the electronic commerce system 306 to perform a task. As a non-limiting example, assuming that the user input 209 comprises an audio signal embodying the command, "purchase this item," the input recognition application 312 may employ a speech recognition algorithm that converts the speech to an instruction capable of being understood by the computing environment 212. Accordingly, in various embodiments, the input recognition application 312 comprises a speech recognition application.

Similarly, assuming that the user input 209 comprises one or more digital images embodying a gesture, the input recognition application 312 processes the one or more digital images to identify the gesture and associate it to a particular machine instruction. For example, the user may perform a first machine-detectable hand gesture to purchase an item 103 or the user may perform a second machine-detectable hand gesture to obtain additional information associated with the item 103.

Further, the receiver control application 309 is executed to generate a receiver task that is communicated to the receiver 109, thereby causing the receiver task to be performed in the receiver 109. As a non-limiting example, the receiver control application 309 may employ an output generation application 315 to verify placement of an item 103 in the virtual shopping cart or to verify a server task has been performed. In various embodiments, the output generation application 315 comprises a speech generation application or an application that generates one or more user interfaces or visual content to be rendered on a display.

In various embodiments, the receiver control application 309 is executed to generate a client task to be performed by a client device and send the client task to the client device over the network. As a non-limiting example, the receiver control application 309 may generate an e-mail, a user interface, a network page, or other visual content to be presented to the client device over the network. In another example, the receiver control application 309 may generate a sound or speech to be played through a speaker communicatively coupled to the client device.

The web service 224 is executed to provide a medium for communication between the computing environment 212, the receiver 109, and/or one or more client devices over the network 130. The web service 224 may comprise a web-based application programming interface (API) embodied in software that facilitates programmatic service calls (e.g., API calls) made by the receiver 109 or client devices to communicate with the electronic commerce system 306, the receiver control application 309, and/or other services or applications not described herein. According to various embodiments, the web-based API may further comprise a representational state transfer (REST) API, a simple object access protocol (SOAP) API, or another suitable API.

The data stored in the data store 303 includes, for example, an item catalog 330, RFID tag data 333, data associated with one or more user accounts 336, and potentially other data. The item catalog 330 may include various item data 339 comprising information regarding items 103 in a catalog. Such items 103 may correspond to products, goods, services, downloads, and so on, which may be offered for order by one or more merchants by way of the electronic commerce system 306. The various data 339 regarding each item 103 may include name, description, price, genre, sub-genre, categories, representative images, videos, tax categories, options, shipping categories, and so on. The item data 339, for a particular item 103, may also include a name, an identifier 206, nutritional information, lot numbers, batch numbers, purchase information, expiration dates, and/or other information.

The RFID tag data 333 includes information that may be used to correlate or map an RFID tag 100 detected by a receiver 109 with data residing in the data store 303. Accordingly, the RFID tag data 333 may include identifier data 342 that can be used to map an identifier 206 corresponding to an RFID tag 100 with information associated with the identifier 206 in memory.

Data associated with the user accounts 336 includes information associated with the use of the receiver 109 by a particular person or a group of persons. In various embodiments, the receiver 109 may be associated with a particular user account 336 during manufacture of the receiver 109 and/or prior to the shipment of the receiver 109. Accordingly, when the receiver 109 is in use by a person, the receiver 109 is associated with a particular user account 336. Alternatively, when a receiver 109 is received, the receiver 109 may be associated with a particular user account 336 using a sign up process, such as accessing a network page and providing a serial number of the receiver 109 that causes the receiver control application 309 to associate the receiver 109 with a user account 336. The user account 336 may include financial information (e.g., bank account information or credit card information) that facilitates a purchase or lease of an item 103. Further, data associated with a user account 336 may include virtual shopping cart data 345 and user item data 348. Virtual shopping cart data 345 may include items 103 placed in a virtual shopping cart by the electronic commerce system 306 and/or items 103 previously purchased in association with a particular receiver 109. User item data 348 includes previous purchases of items 103 and/or predefined configurations associated with the use of the receiver 109. For example, a user may predefine that all purchases made via the receiver 109 use a particular credit card associated with the user account 336. As another example, the user may predefine that the electronic commerce system 306 purchases a certain quantity of an item 103 via the receiver 109 when the purchase of the item 103 is vocalized to the receiver 109.

The RFID tag 100 is representative of one or more RFID tags 100 that may communicate electronically stored information 360 via a radio signal to the receiver 109. In various embodiments, the RFID tag 100 comprises a microchip communicatively coupled to a radio antenna. The RFID tag 100 communicates electronically stored information 360 to the receiver 109 from its resident memory, which may include an identifier 206 of the item 103, such as an electronic product code (EPC). According to various embodiments, the RFID tag 100 may be a passive RFID tag 100 having a capacitive touch interface that, when manipulated by a person, completes a circuit in the RFID tag 100, thereby causing the RFID tag 100 to emit an identifier capable of being read by the receiver 109. When the RFID tag 100 is not touched or otherwise manipulated by a person, the RFID tag 100 is in an inactive state incapable of identification, interrogation, and/or detection by the receiver 109.

The receiver 109 is representative of one or more receivers 109 that obtain the electronically stored information 360 emitted from the RFID tag 100 and send the electronically stored information 360 over the network 130. Further, the receiver 109 may obtain user input 209 from a user and may perform various tasks, such as notifying the user when a particular task has occurred in the computing environment 212. To this end, the receiver 109 may comprise an antenna 112, processing circuitry 115 (FIG. 1), an input device 118, an output device 121, a power source 124, a network interface 127, and/or other components as can be appreciated. The antenna 112 may be a radio-frequency antenna configured to obtain the electronically stored information 360 emitted from the RFID tag 100 over the radio-frequency electromagnetic field 106. The processing circuitry 115 may comprise software and/or physical circuitry capable of controlling the components of the receiver 109 and/or parsing the electronically stored information 360 to obtain an identifier 206. In various embodiments, the processing circuitry 115 comprises at least one hardware processor. Further, in various embodiments, the processing circuitry 115 comprises an integrated circuit and/or a microcontroller.

Next, a general description of the operation of the various components of the networked environment 300 is provided. To begin, a manufacturer, a retailer, or a vendor may manufacture and/or program one or more RFID tags 100 such that the RFID tag 100 is preconfigured with an identifier 206. For example, a warehouse or fulfillment center may place an RFID tag 100 on an item 103 as it is being fulfilled for shipment. As the RFID tag 100 is being placed on the item 103, the data store 303 may be updated such that the identifier 206 is associated with the item 103 being fulfilled. In various embodiments, an owner of the item 103 may place the RFID tag 100 on the item 103 after its purchase. The owner of the item 103 may access a portal on a client device to register the item 103 with the RFID tag 100 such that the identifier 206 associated with the RFID tag 100 is capable of identifying the item 103.

Ultimately, a person having possession of the item 103 may utilize the RFID tag 100 and the receiver 109 to obtain additional information about the item 103 or to perform a task associated with the item 103. The receiver 109 attempts to detect one or more RFID tags 100 in an environment. In various embodiments, the one or more RFID tags 100 may include passive RFID tags 100 and/or active RFID tags 100. Assuming that the one or more RFID tags 100 include passive RFID tags 100, the receiver 109, via the transceiver 114, communicates a radio signal that provides power to the passive RFID tags 100. The receiver 109, via the antenna 112, obtains electronically stored information 360 from the one or more RFID tags 100. Assuming that the one or more RFID tags 100 include active RFID tags 100, the receiver 109, via the antenna 112, obtains electronically stored information 360 from the active RFID tags 100 that are capable of producing their own radio signals.

As discussed above, one or more RFID tags 100 may be employed that include a touch-sensitive interface 133 configured to emit the identifier 206 in a radio-frequency signal in response to a person manipulating the passive RFID tag 100. For example, when the RFID tag 100 is touched by a person (as shown in FIG. 2), a circuit is completed in the RFID tag 100 making the RFID tag 100 active and capable of transmitting to the receiver 109. The touch-sensitive interface 133 may comprise, for example, a capacitive touch interface. When the RFID tag 100 is not touched or otherwise manipulated by the person, the RFID tag 100 is in an inactive state incapable of identification by the receiver 109.

When an RFID tag 100 transmits RFID data 203 to the receiver 109, the RFID data 203 is processed to locate an identifier 206 associated with a particular item 103. In various embodiments, the identifier 206 may include a unique tag serial number, or the identifier 206 may include product-related information such as an electronic product code (EPC), a stock number, a proprietary serial number, a lot number, a batch number, a production date, a version, an expiration date, and/or other information.

Subsequently, the receiver 109 attempts to obtain user input 209 within a predefined period of time after the RFID tag 100 has been manipulated and/or detected. The user input 209 may be obtained, for example, via the input device 118. In one embodiment, the input device 118 includes a digital camera and the user input 209 obtained by the input device 118 includes one or more digital images captured by the digital camera to be used in gesture recognition. In another embodiment, the input device 118 is a microphone and the user input 209 obtained by the input device 118 includes an audio signal captured by the microphone, such as a command vocalized by a person within audible range of the receiver 109. At this time, the receiver 109 has the identifier 206 associated with the item 103 and an instruction (i.e., user input 209) provided by a person. The identifier 206 and the user input 209 may be encoded for transmission and communicated over the network 130 to the computing environment 212 for processing.

After a person provides user input 209 to the receiver 109, a response may be provided by the receiver 109 as an indication that the receiver data 215 has been communicated to and/or received by the computing environment 212. The receiver 109 may receive task data 370 that causes the receiver 109 to perform a task. For example, the computing environment 212 may generate and send task data 370 comprising a signal or other data (e.g., a tone, a user interface, or a generated voice message) that may be presented to the user via the output device 121 coupled to the receiver 109. Assuming that the user input 209 was a vocalized command to "provide nutritional information" in association with a box of cereal, the identifier 206 may be mapped or used to locate a corresponding identifier 206 in the data store 303. Nutritional information associated with the identifier 206 may be located and accessed by the computing environment 212, encoded as a voice message in an audio signal, and communicated to the receiver 109 as task data 370 for playback via the output device 121. In some embodiments, all or a portion of the functions performed by the computing environment 212 may be performed by a client device, such as a smartphone, a laptop computing device, or a tablet computing device. The data may be communicated to the client device via low energy Bluetooth®, ZigBee®, or a similar technology.

Figure 4:
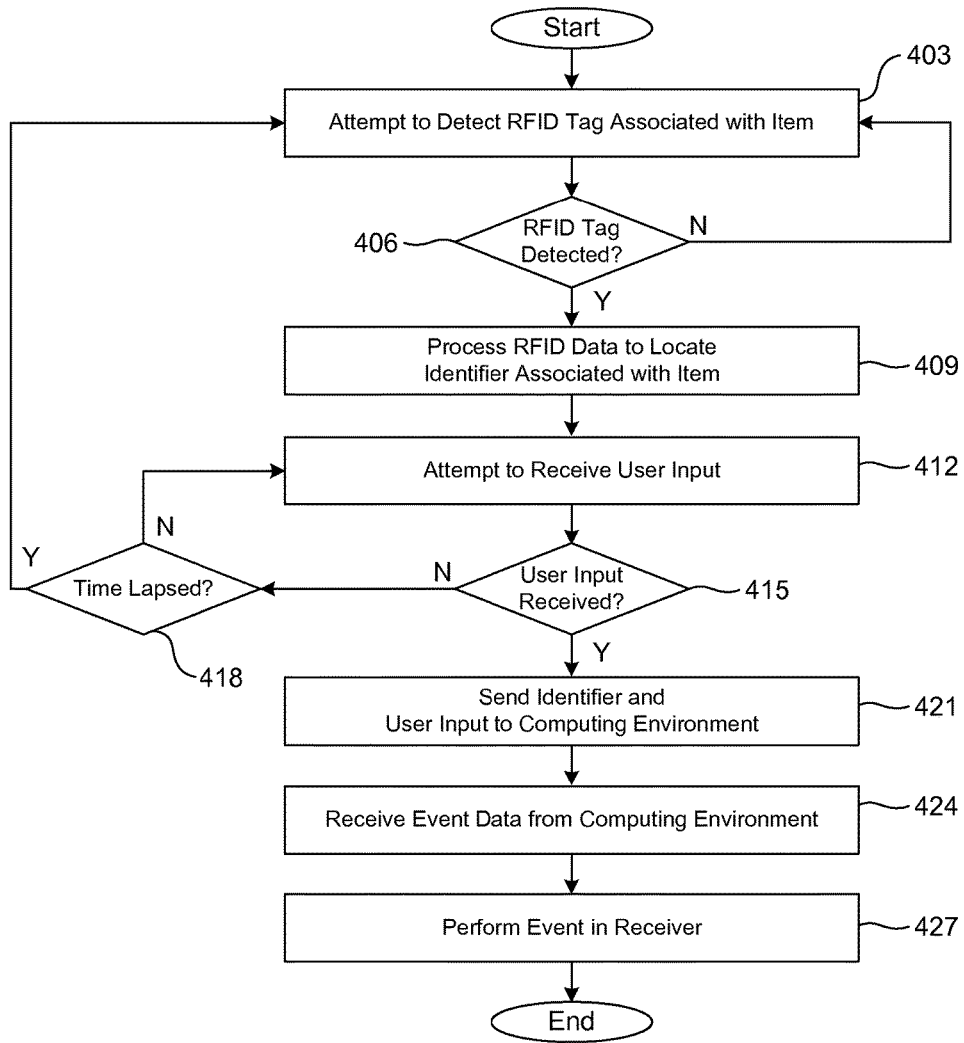
FIG. 4 is a flowchart illustrating one example of functionality implemented as portions of processing circuitry in a receiver of the networked environment of FIG. 3 according to various embodiments of the present disclosure.

Referring next to FIG. 4, shown is a flowchart that provides one example of the operation of a portion of the receiver 109 according to various embodiments. It is understood that the flowchart of FIG. 4 provides merely an example of the many different types of functional arrangements that may be employed to implement the operation of the portion of the receiver 109 as described herein. As an alternative, the flowchart of FIG. 4 may be viewed as depicting an example of elements of a method performed by the processing circuitry 115 (FIG. 1) coupled to the receiver 109 according to one or more embodiments.

As discussed above, a manufacturer, a retailer, or a vendor may manufacture and/or program one or more RFID tags 100 such that the RFID tag 100 is preconfigured with an identifier 206. The RFID tag 100 may be attached to an item 103 during its manufacture or at a time during which the item 103 is present in the marketplace. Ultimately, a person may purchase or otherwise obtain the item 103 associated with the RFID tag 100. The person having possession of the item 103 after its purchase may utilize the RFID tag 100 to obtain additional information about the item 103, or may perform a task in association with the item 103. For example, the person may manipulate the RFID tag 100 by pressing on the RFID tag 100 with a finger. Assuming a receiver 109 is within a range of the person and the RFID tag 100, the person may vocalize a command such as "provide nutritional information" while a touch-sensitive interface 133 of the RFID tag 100 is being pressed (or within a predefined time thereafter). The identifier 206 preconfigured in the RFID tag 100 may be transmitted form the RFID tag 100 to the receiver 109 over a radio-frequency signal. User input 209 may be obtained in association with the identifier 206 and the user input 209 and the identifier 206 may be communicated to the computing environment 212 for processing. The computing environment 212 may obtain desired information, encoded the desired information for transmission, and send the desired information to the receiver 109 to perform an event, as will be discussed below.

Beginning with 403, the receiver 109 attempts to interrogate, detect, and/or communicate with one or more RFID tags 100 in an environment. In various embodiments, the one or more RFID tags 100 may include passive RFID tags 100 and/or active RFID tags 100. Assuming that the one or more RFID tags 100 include passive RFID tags 100, the receiver 109, via the transceiver 114, communicates a radio signal that provides power to the passive RFID tags 100. The receiver 109, via the antenna 112, obtains electronically stored information 360 from the one or more RFID tags 100. Assuming that the one or more RFID tags 100 include active RFID tags 100, the receiver 109, via the antenna 112, obtains electronically stored information 360 from the active RFID tags 100 that are capable of producing their own radio signals.

As discussed above, one or more RFID tags 100 may be employed that include a touch-sensitive interface 133 (e.g., a capacitive touch interface or a button communicatively coupled to the RFID tag 100) configured to emit the identifier 206 in a radio-frequency signal in response to a person manipulating the passive RFID tag 100. For example, when the RFID tag 100 is touched by a finger of a person (as shown in FIG. 2), a circuit is completed in the RFID tag 100, thereby causing the RFID tag 100 to emit an identifier capable of being read by the receiver 109. When the RFID tag 100 is not touched or otherwise manipulated by the person, the RFID tag 100 is in an inactive state incapable of identification by the receiver 109.

Various situations might be imagined where there are a multitude of passive or active RFID tags 100 emitting electronically stored information 360 at a given time in the environment. Accordingly, the receiver 109 may be configured to filter out irrelevant RFID tags 100 while only certain RFID tags 100 are processed. For example, the electronically stored information 360 may be processed by the receiver 109 to determine whether the RFID tag 100 is associated with a particular company, line of products, etc. Hence, the electronically stored information 360 may be preconfigured in the RFID tags 100 and associated with items 103 such that only proprietary receivers 109 are capable of reading or processing the electronically stored information 360. This may include preconfiguring the RFID tags 100 to include electronically stored information 360 that has been encrypted, wherein the receiver 109 is capable of decrypting the information. In alternative embodiments, information in a header of the electronically stored information 360 may be used to determine whether to filter out irrelevant RFID tags 100. Further, the receiver 109 may be capable of collision avoidance.

In 406, it is determined whether an RFID tag 100 has been identified. Identification of an RFID tag 100 may include processing electronically stored information 360 communicated to the receiver 109 to determine whether the electronically stored information 360 includes a header or other information capable of verifying that the emitting device is an RFID tag 100. In various embodiments, the electronically stored information 360 may be processed by the receiver 109 to determine whether a valid identifier 206 is included in the information. If the receiver 109 has not detected an RFID tag 100, the process continues to 403 where the receiver 109 continues to make subsequent attempts to identify or detect RFID tags 100 within a range of the receiver 109.

Conversely, if the receiver 109 is successful in identifying an RFID tag 100, the process continues to 409 where RFID data 203 communicated to the receiver 109 by the RFID tag 100 is processed to locate an identifier 206 associated with a particular item 103. In various embodiments, the identifier 206 may include a unique tag serial number, or the identifier 206 may include product-related information such as an electronic product code (EPC), a stock number, a proprietary serial number, a lot number, a batch number, a production date, a version, an expiration date, other information, or any combination thereof.

Next, in 412, the receiver 109 may attempt to receive or obtain user input 209 (FIG. 2), for example, via the input device 118 within a predefined period of time after the RFID tag 100 has been manipulated and/or detected. In one embodiment, the input device 118 includes a digital camera and the user input 209 obtained by the input device 118 includes one or more digital images captured by the digital camera to be used in gesture recognition. In another embodiment, the input device 118 is a microphone and the user input 209 obtained by the input device 118 includes an audio signal captured by the microphone, such as a command vocalized by a person within audible range of the receiver 109.

As may be appreciated, in many situations a person may not provide user input 209, such as when a person forgets or the person is not speaking loudly. Accordingly, it is determined if user input 209 is received in 415. If no user input 209 has been received by the receiver 109, the process continues to 418 to determine whether a predefined period of time has lapsed after manipulation and/or detection of the RFID tag 100. If the predefined period of time has lapsed, the process may revert back to 403. On the other hand, if the predefined period of time has yet to lapse, the process may proceed to 412 to make subsequent attempts to receive user input 209.

Assuming user input 209 has been received, consequently, the receiver 109 will have an identifier 206 associated with a particular item 103 and an instruction (i.e., user input 209) provided by a person. The identifier 206 and the user input 209 may be encoded for transmission and communicated over the network 130 to the computing environment 212 for processing, as will be discussed in greater detail below with respect to FIG. 5.

After a person provides user input 209 to the receiver 109, the person may desire or expect an indication or a response that the user input 209 has been received in association with the particular item 103. Thus, in 424, the receiver 109, via the network interface 127, may receive task data 370 that causes the receiver 109 to perform a task. For example, the computing environment 212 may generate and send task data 370 comprising a signal or other data (e.g., a tone, a user interface, or a generated voice message) that may be presented to the user via the output device 121 coupled to the receiver 109. For example, assuming that the user input 209 was a vocalized command to "provide nutritional information" in association with a box of cereal, the nutritional information may be obtained by the computing environment 212, encoded as a voice message in an audio signal, and communicated to the receiver 109 as task data 370.

In 427, the receiver 109 performs the task as set forth in the task data 370. For example, in various embodiments, the output device 121 may comprise a display, such as a LCD display. The receiver 109 may present a user interface or other visual content in the display that was generated by the output generation engine 315 executable in the computing environment 212. In other embodiments, the output device 121 may comprise a speaker. The receiver 109 may play an audio signal or a generated voice message in the speaker that was generated by the computing environment 212. The task may be performed as it is received in the receiver 109 or may be performed by the receiver 109 after a predefined period of time.

Figure 5:
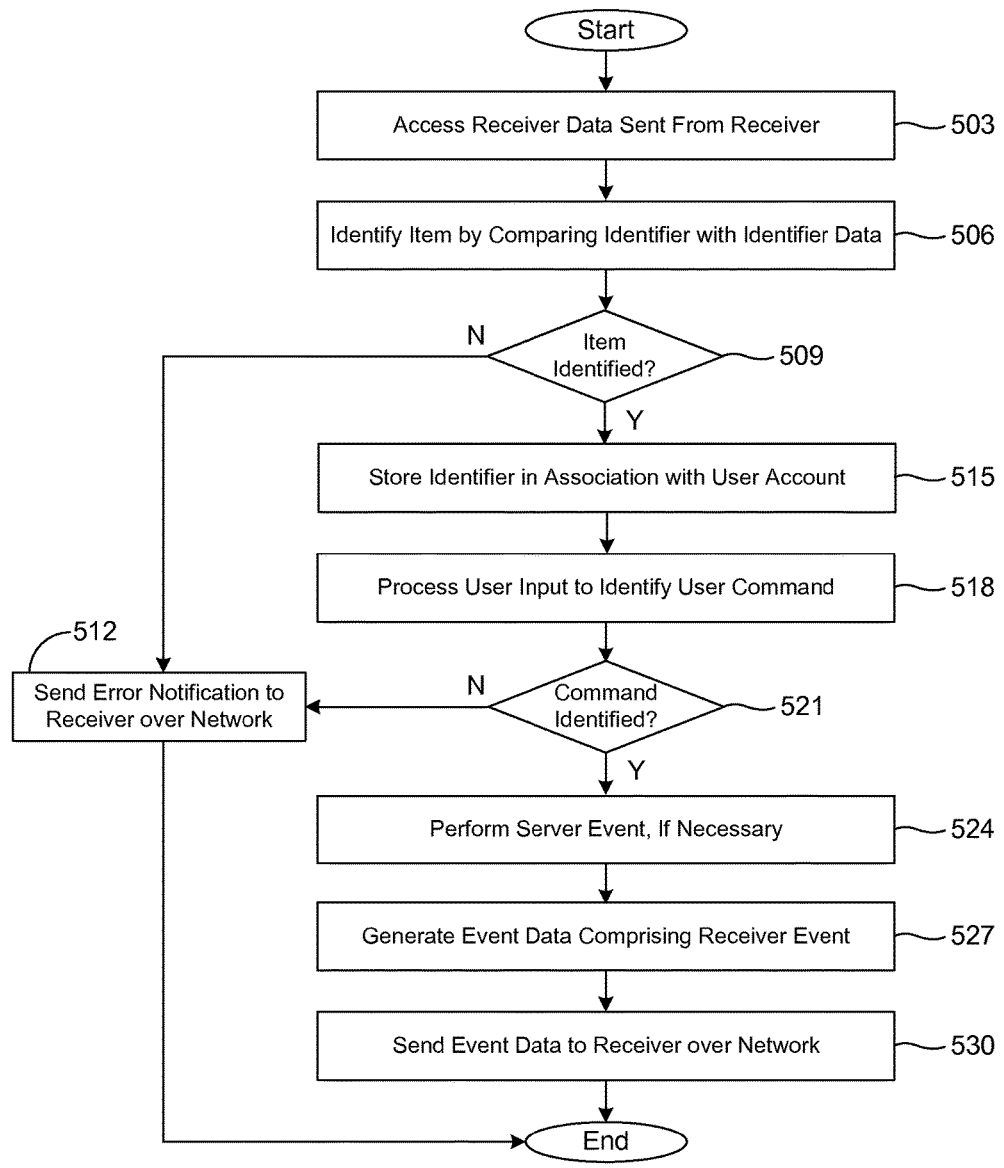
FIG. 5 is a flowchart illustrating one example of functionality implemented as portions of a receiver control application executed in a computing environment of the networked environment of FIG. 3 according to various embodiments of the present disclosure.

Moving on to FIG. 5, shown is a flowchart that provides one example of the operation of a portion of the receiver control application 309 according to various embodiments. It is understood that the flowchart of FIG. 5 provides merely an example of the many different types of functional arrangements that may be employed to implement the operation of the portion of the receiver control application 309 as described herein. As an alternative, the flowchart of FIG. 5 may be viewed as depicting an example of elements of a method implemented in the computing environment 212 (FIG. 2) according to one or more embodiments.

Beginning with 503, receiver data 215 (FIG. 2) communicated to the at least one computing environment 212 by the receiver 109 (FIG. 1) is accessed for processing. Accessing the receiver data 215 may include retrieving the receiver data 215 from the data store 303 or placing the receiver data 215 in a buffer as it is received in the computing environment 212. According to various embodiments, the receiver data 215 comprises at least the identifier 206 communicated to the receiver 109 by an RFID tag 100 and user input 209 obtained by the input device 118 (FIG. 1) communicatively coupled to the receiver 109.

Next, in 506, the identifier 206 is compared to identifier data 342 stored in the data store 303, for example, to identify the item 103 associated with the identifier 206. In 509, it is determined whether at least one item 103 has been identified using the identifier 206. For example, assuming an identifier 206 includes the string "AJF1212893," the computing environment 212 may perform a structured query for any items 103 in the data store 303 associated with that particular identifier 206. The structured query may be described as:

SELECT   *   FROM   items   WHERE identifier="AJF1212893"

where "items" is the name of the database table.

If no items 103 are returned in the query, the process may proceed to 512 where an error notification may be sent to the receiver 109 over the network 130. The error notification may cause a task in the receiver 109, such as notifying a person that an item 103 associated with the particular identifier 206 could not be identified. Conversely, if at least one item 103 is identified in the search results for the query, the process may continue to 515 where the identifier 206 may be stored in association with a user account 336. The identifier 206 may be used in generating recommendations for future purchases of items 103, placing recurring items 103 in lists, etc.

In 518, the user input 209 may be processed to identify an instruction, a user command, a question, a direction, etc. To this end, the user input 209 may be processed by the input recognition application 312. Assuming that the user input 209 comprises an audio signal embodying speech provided by a user of the receiver 109, the input recognition application 312 may apply a speech recognition algorithm to convert the speech to one or more machine-readable instructions. As a non-limiting example, assuming that the user input 209 comprises an audio signal embodying the command, "provide nutritional information," the speech recognition algorithm may convert the speech to an instruction capable of being understood by the computing environment 212. Similarly, assuming that the user input 209 comprises one or more digital images embodying a gesture, the input recognition application 312 may apply an image recognition algorithm to process the one or more digital images to identify the gesture and associate it with one or more machine-readable instructions.

As circumstances may arise where user input 209 is incapable of being recognized by the computing environment 212, such as when a person hasn't clearly articulated a command to the receiver 109, in 521 the computing environment 212 may determine whether a command has been identified from the user input 209. Assuming a command cannot be identified, the process may proceed to 512 where an error notification may be sent to the receiver 109 over the network 130. Conversely, if a command has been identified in the user input 209, in 524, a server task may be performed based at least in part on the identifier 206 and the user input 209. In various embodiments, the server task may include adding an item 103 associated with the identifier 206 to a virtual shopping cart or a shopping list, obtaining information associated with the item 103 from the data store 303, confirming receipt of a shipment of the item 103, determining whether the item 103 has expired, communicating an audio signal comprising information associated with the item 103 to the receiver 109, generating a customer review for the item 103 in the electronic commerce system 306, creating a personal note that is stored in association with a user account, call customer service associated with the item 103, causing audio and/or visual instructions describing how to use the item 103 to be presented on a display of the receiver 109 or a client device, starting a return process to return the item 103 to the seller of the item 103, or other tasks.

In 527, task data 370 may be generated by the computing environment 212 that comprises at least one receiver task for transmission to the receiver 109. Generating the task data 370 may include, for example, generating an audio signal comprising speech generated by the output generation application 315. For example, the information obtained about the item 103 during performance of the server task (524) may be used to generate speech embodied in an audio signal via the output generation application 315. Similarly, speech embodied in an audio signal may be generated by the output generation application 315 that verifies that the server task has been performed. For example, it may be communicated to the person by the receiver 109 that a particular item 103 has been added to a virtual shopping cart, has been purchased, etc. Alternatively, the output generation application 315 may generate visual outputs (e.g., user interfaces or other visual content capable of being rendered in a display) to be presented to the user via the output device 121 or any other type of output in response to the user input. In 530, the task data 370 is communicated by the computing environment 212 to the receiver 109 over the network 130.

Figure 6:
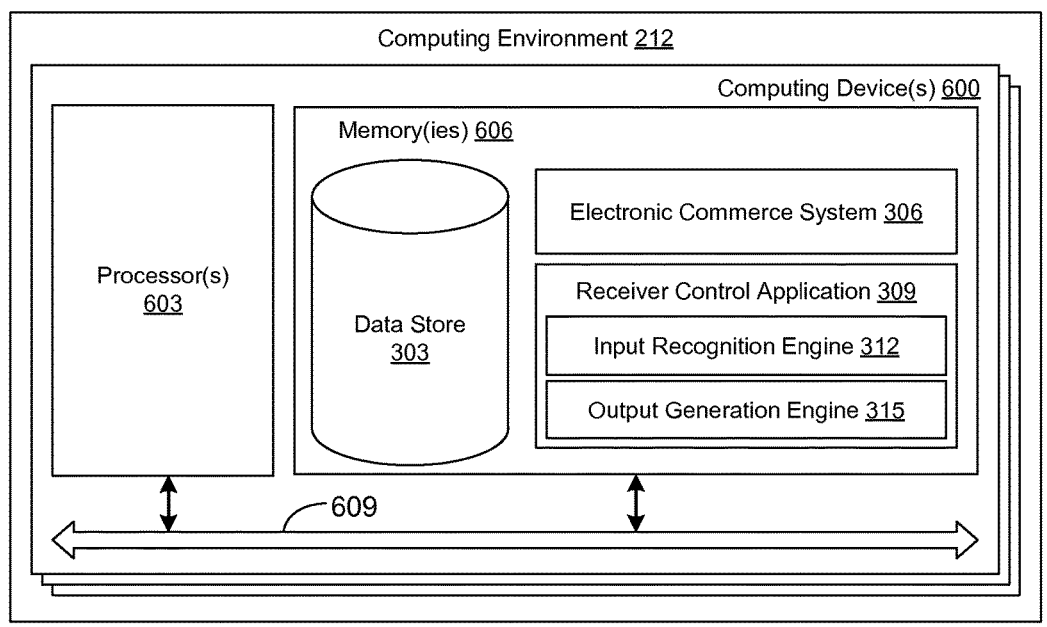
FIG. 6 is a schematic block diagram that provides one example illustration of a computing environment employed in the networked environment of FIG. 3 according to various embodiments of the present disclosure.

With reference to FIG. 6, shown is a schematic block diagram of the computing environment 212 according to an embodiment of the present disclosure. The computing environment 212 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the electronic commerce system 306, the receiver control application 309, the input recognition application 312, the output generation application 315, the web service 224, and potentially other applications. Also stored in the memory 606 may be a data store 303 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce system 306, the receiver control application 309, the input recognition application 312, the output generation application 315, the web service 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the receiver 109 and the computing environment 212. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 306, the receiver control application 309, the input recognition application 312, the output generation application 315, the web service 224, and the functions performed by the receiver 109, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 306, the receiver control application 309, the input recognition application 312, the output generation application 315, the web service 224, and/or the functions performed by the receiver 109, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 212. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A radio-frequency (RF) receiver, comprising:
an antenna configured to receive a radio-frequency signal from a radio-frequency identification (RFID) tag associated with an item, the radio-frequency signal comprising at least an identifier associated with the item, the RFID tag being passive and having a touch-sensitive interface configured to emit the radio-frequency signal comprising the identifier in response to a manipulation of the RFID tag by a user;

an input device configured to receive an audible input from the user in association with the item;

a communication interface configured to communicate the identifier and the input to at least one computing device over a network, and receive a task from the at least one computing device based at least in part on the identifier and the input over the network; and processing circuitry configured to perform the task received from the at least one computing device, the task being an audible response to the input from the user determined by the at least one computing device based at least in part on the identifier and the input.

2. The RF receiver of claim 1, wherein the touch-sensitive interface further comprises a capacitive touch interface configured to emit the radio-frequency signal comprising the identifier in response to the manipulation of the RFID tag.

3. The RF receiver of claim 1, wherein the input device comprises a microphone and the input comprises a voice command.

4. The RF receiver of claim 1, wherein the input device comprises an imaging device and the input obtained by the input device comprises at least one image captured by the imaging device.

5. A system, comprising:

a radio frequency identification (RFID) tag preconfigured with an identifier associated with an item, the RFID tag being passive and having a touch-sensitive interface configured to emit the identifier in response to a manipulation of the RFID tag; and a receiver comprising processing circuitry that causes the receiver to at least:

identify a radio-frequency signal emitted from the RFID tag, the radio-frequency signal embodying the identifier associated with the item;

receive audible or visual input in association with the item;

communicate the identifier and the input to at least one computing device over a network to cause a performance of a first task based at least in part on the identifier and the input;

receive a second task generated by the at least one computing device and communicated to the receiver over the network, the second task being generated by the at least one computing device based at least in part on the identifier and the input; and perform the second task, the second task being an audible or visual response to the input received.

6. The system of claim 5, wherein the RFID tag comprises a capacitive touch interface configured to emit the radio-frequency signal comprising the identifier in response to a manipulation of the RFID tag.

7. The system of claim 5, wherein the receiver further comprises an input device comprising a microphone and the input comprises an audio signal embodying a voice command.

8. The system of claim 5, wherein the receiver further comprises a speaker and the second task further comprises an audio signal being emitted from the speaker.

9. The system of claim 5, wherein the first task further comprises adding the item associated with the identifier to a virtual shopping cart or confirming receipt of a shipment of the item.

10. The system of claim 5, wherein the first task further comprises communicating an audio signal comprising information associated with the item to the receiver.

11. A method, comprising:

accessing, by at least one computing device, receiver data received from a radio-frequency (RF) receiver over a network, wherein the receiver data comprises at least radio frequency identification (RFID) data obtained from an RFID tag being passive and having a touch-sensitive interface configured to emit the data in response to a manipulation of the RFID tag, wherein the receiver data further comprises:

an item identifier communicated to the RF receiver by the RFID tag;

audible or visual input obtained through an input device communicatively coupled to the RF receiver; and a task identifier communicated to the RF receiver by the RFID tag;

processing, by the at least one computing device, the task identifier to identify a task to be performed in association with the item identifier and the input; and performing, by the at least one computing device, the task in association with the item identifier and the input in the at least one computing device.

12. The method of claim 11, further comprising:

generating, by the at least one computing device, a receiver task to be performed by the RF receiver; and sending, by the at least one computing device, the receiver task to the RF receiver over the network.

13. The method of claim 11, wherein the input device communicatively coupled to the RF receiver further comprises an imaging device and the audible or visual input obtained by the input device further comprises at least one image captured by the imaging device.

14. The method of claim 11, wherein the input device communicatively coupled to the RF receiver further comprises a microphone and the audible or visual input obtained by the input device further comprises an audio signal captured by the microphone.

15. The method of claim 11, wherein the RFID tag is a passive RFID tag comprising a capacitive touch interface configured to emit the item identifier in a radio-frequency signal in response to a manipulation of the passive RFID tag.

16. The method of claim 11, wherein the task is selected from a group consisting of: adding an item associated with the item identifier to a virtual shopping cart, confirming receipt of a shipment of the item, determining whether the item has expired, communicating an audio signal comprising information associated with the item to the RF receiver, obtaining information associated with the item from a data store, generating a customer review for the item, creating a personal note that is stored in association with a user account, initiate a call to customer service associated with the item, causing audio and/or visual instructions describing how to use the item to be presented, and starting a return process to return the item to a seller.

17. The method of claim 11, further comprising:

generating, by the at least one computing device, an audio signal comprising speech generated by an output generation application, the speech comprising information verifying that the task has been performed; and communicating, by the at least one computing device, the audio signal to the RF receiver over the network.

18. The method of claim 11, further comprising:

generating, by the at least one computing device, an audio signal comprising speech generated by an output generation application, the speech comprising information associated with an item associated with the item identifier; and communicating, by the at least one computing device, the audio signal to the RF receiver over the network.

19. The method of claim 11, further comprising:
- generating, by the at least one computing device, a client task to be performed by a client device; and
- sending, by the at least one computing device, the client task to the client device over the network.

20. The system of claim 5, wherein the first task or the second task is selected from a group consisting of: adding an item associated with the item identifier to a virtual shopping cart, confirming receipt of a shipment of the item, determining whether the item has expired, communicating an audio signal comprising information associated with the item to the receiver, obtaining information associated with the item from a data store, generating a customer review for the item, creating a personal note that is stored in association with a user account, initiate a call to customer service associated with the item, causing audio and/or visual instructions describing how to use the item to be presented, and starting a return process to return the item to a seller.

* * * * *